United States Patent
Xie et al.

(10) Patent No.: US 11,604,254 B2
(45) Date of Patent: Mar. 14, 2023

(54) RADAR-BASED POSTURE RECOGNITION APPARATUS AND METHOD AND ELECTRONIC DEVICE

(71) Applicant: Fujitsu Limited, Kawasaki (JP)

(72) Inventors: Lili Xie, Beijing (CN); Jun Tian, Beijing (CN); Hongchun Li, Beijing (CN); Qian Zhao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 16/902,749

(22) Filed: Jun. 16, 2020

(65) Prior Publication Data

US 2021/0048511 A1    Feb. 18, 2021

(30) Foreign Application Priority Data

Aug. 16, 2019    (CN) .......................... 201910758029.9

(51) Int. Cl.
*G01S 7/41*    (2006.01)
(52) U.S. Cl.
CPC .............. *G01S 7/415* (2013.01); *G01S 7/418* (2013.01)
(58) Field of Classification Search
CPC .................. G01S 7/415; G01S 7/418
See application file for complete search history.

(56) References Cited

U.S. PATENT DOCUMENTS

| 2015/0223733 A1* | 8/2015 | Al-Alusi ................. G01S 7/415 600/407 |
| --- | --- | --- |
| 2018/0192919 A1* | 7/2018 | Nakayama ............. A61B 5/1116 |
| 2019/0277947 A1* | 9/2019 | Abe ....................... G01S 7/4802 |
| 2020/0011988 A1* | 1/2020 | Nakayama .............. G01S 13/52 |

FOREIGN PATENT DOCUMENTS

| CN | 107749143 A | 3/2018 |
| --- | --- | --- |
| CN | 108805021 A | 11/2018 |
| CN | 109961058 A | 7/2019 |
| CN | 110021145 A | 7/2019 |
| WO | 2008/008046 A1 | 1/2008 |

* cited by examiner

*Primary Examiner* — Marcus E Windrich
(74) *Attorney, Agent, or Firm* — Staas & Halsey LLP (57) ABSTRACT

Embodiments of this disclosure provide a radar-based posture recognition apparatus, method and an electronic device. The method includes: acquiring radar reflection point information based on radar echo signals reflected from a detected target, and clustering radar reflection points; in a first time period, calculating spatial morphological feature information and/or motion feature information of a target point set obtained by clustering; in a second time period, counting the spatial morphological feature information and/or the motion feature information of a plurality of first time periods to obtain motion process feature information in the second time period; and taking the motion process feature information within a second time period in which a current moment is present and the spatial morphological feature information and/or the motion feature information in a first time period in which the current moment is present as a feature set, to determine the posture of the detected target.

10 Claims, 4 Drawing Sheets

Fig. 5

RADAR-BASED POSTURE RECOGNITION APPARATUS AND METHOD AND ELECTRONIC DEVICE

CROSS-REFERENCE TO RELATED APPLICATIONS

This application is based on and hereby claims priority to Chinese Application No. 201910758029.9, filed Aug. 16, 2019, in the State Intellectual Property Office of China, the disclosure of which is incorporated herein by reference.

TECHNICAL FIELD

This disclosure relates to the field of radar monitoring.

BACKGROUND

A radar emits electromagnetic waves via a transmit antenna, receives corresponding reflected waves after being reflected by different objects, and analyzes the received signals, which may effectively extract information, such as a position of the object from the radar, and a radial motion speed, and such information may meet demands of many application scenarios.

Therefore, the development of radar has brought new solutions to many indoor applications, such as human tracking, fall detection, action detection, and vital sign monitoring. Compared with a sensor-based scheme, the radar is easy to install and has a large coverage; and compared with a video-based scheme, the radar has no privacy invasion and is not affected by environmental factors, such as light.

In current technical solutions of radar-based object detection (such as human tracking), radar echo signals are mainly analyzed to obtain effective target reflection points, and the reflection points are clustered to obtain information, such as a position of the object.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to one aspect of the embodiments of this disclosure, there is provided a radar-based posture recognition apparatus, including a memory that stores a plurality of instructions, and a processor coupled to the memory and configured to execute the plurality of instructions. The processor is configured to execute the plurality of instructions to: acquire radar reflection point information based on radar echo signals reflected from a detected target, and cluster radar reflection points calculate, in a first time period, spatial morphological feature information and/or motion feature information of a target point set obtained by clustering; and count, in a second time period, the spatial morphological feature information and/or the motion feature information of a plurality of first time periods to obtain motion process feature information in the second time period.

The processor is configured to take the motion process feature information within a time period in which a current moment is present and the spatial morphological feature information and/or take the motion feature information in another time period in which the current moment is present as a feature set, and determine whether the feature set satisfies a first condition set.

The processor is further configured to determine whether a posture of the detected target is that of lying on the floor when the feature set is determined to satisfy the first condition set; determine whether the feature set satisfies a second condition set in a case where the feature set is determined not satisfy the first condition set, determine whether the feature set satisfies a third condition set in a case where the feature set satisfies the second condition set, determine that a posture of the detected target is that of lying in bed in a case where the feature set is determined to satisfy the third condition set; and determine whether the feature set satisfies a fourth condition set in a case where the feature set is determined not satisfy the second condition set or the third condition set, determine whether the feature set satisfies a fifth condition set in a case where the feature set is determined to satisfy the fourth condition set, and determine that a posture of the detected target is that of walking in a case where the feature set is determined to satisfy the fifth condition set.

According to another aspect of the embodiments of this disclosure, there is provided a radar-based posture recognition method. The method including: acquiring radar reflection point information based on radar echo signals reflected from a detected target, and clustering radar reflection points; in a first time period, calculating spatial morphological feature information and/or motion feature information of a target point set obtained by clustering; in a second time period, counting the spatial morphological feature information and/or the motion feature information of a plurality of first time periods to obtain motion process feature information in the second time period, and taking the motion process feature information within a second time period in which a current moment is present and the spatial morphological feature information and/or the motion feature information in a first time period in which the current moment is present as a feature set, and determining whether the feature set satisfies a first condition set.

The method further includes: determining that a posture of the detected target is lying on the floor when the feature set is determined to satisfy the first condition set; determining whether the feature set satisfies a second condition set in a case where the feature set is determined not satisfy the first condition set, determining whether the feature set satisfies a third condition set in a case where the feature set is determined to satisfy the second condition set, determining that a posture of the detected target is lying in bed in a case where the feature set is determined to satisfy the third condition set; determining whether the feature set satisfies a fourth condition set in a case where the feature set is determined not satisfy the second condition set or the third condition set, determining whether the feature set satisfies a fifth condition set in a case where the feature set is determined to satisfy the fourth condition set, and determining that a posture of the detected target is walking in a case where the feature set is determined to satisfy the fifth condition set.

According to a further aspect of the embodiments of this disclosure, there is provided an electronic device, including a memory and a processor, the memory storing a computer program, and the processor being configured to carry out the above-described radar-based posture recognition method.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, a density-based spatial clustering of applications with noise (DBSCAN) can be employed for clustering; however, this disclosure is not limited thereto, and for example, other clustering algorithms can also be employed.

It was found by the inventors that postures recognition is in demand-currently; however, in an actual scenario, the environment is relatively complicated, and there exists much noise in reflection points, and precision posture recognition is generally not high and the amount of calculation is huge by using machine learning method Addressed to at least one of the above problems, embodiments of this disclosure provide a radar-based posture recognition apparatus and method and an electronic device, which may recognize multiple daily actions and postures at a relatively low amount of calculation with high precision.

An advantage of the embodiments of this disclosure exists in that a process feature in the second time period and a transient feature in the first time period are taken as a feature set by combining them, it is first decided whether the posture of the detected object satisfies the condition of lying on the floor, then it is decided whether the posture of the detected object satisfies the condition of lying in bed, and finally, it is decided whether the posture of the detected object satisfies the condition of walking. Hence, not only the posture of the detected object may be decided based on the radar, but also multiple daily actions and postures may be recognized at a relatively low amount of calculation with high precision.

Embodiments of the First Aspect

The embodiment of this disclosure provides a radar-based posture recognition method.

Figure 1:
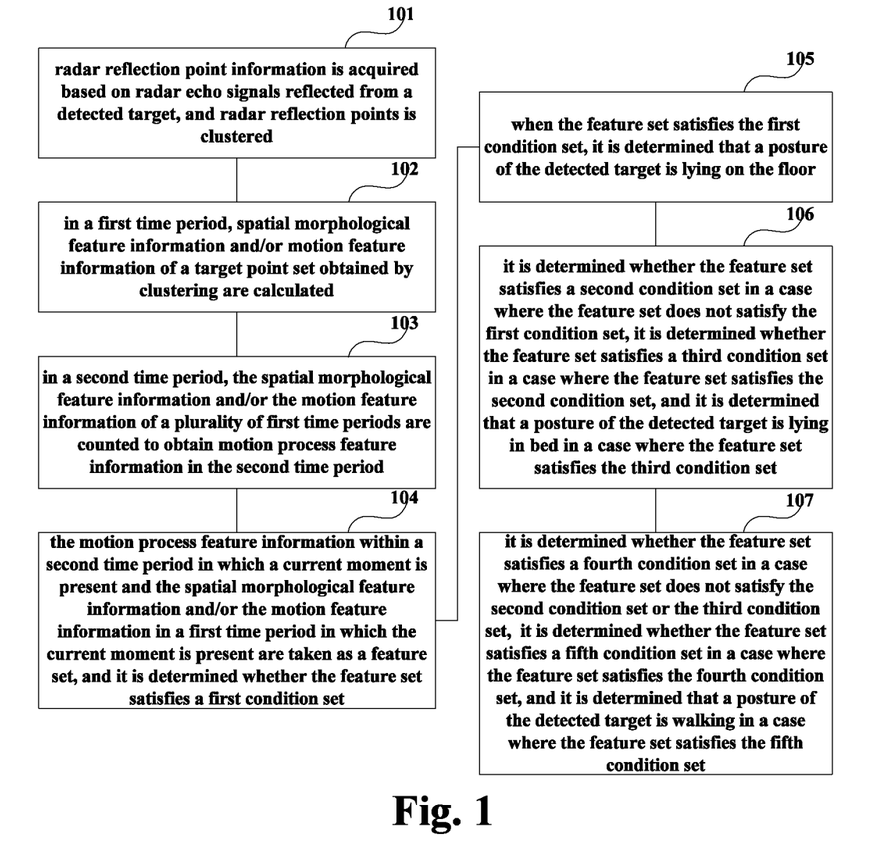
FIG. 1 is a schematic diagram of the radar-based posture recognition method of an embodiment of this disclosure.

FIG. 1 is a schematic diagram of the radar-based posture recognition method of the embodiment of this disclosure. As shown in FIG. 1, the method includes:

101: radar reflection point information is acquired based on radar echo signals reflected from a detected target, and radar reflection points is clustered;

102: in a first time period, spatial morphological feature information and/or motion feature information of a target point set obtained by clustering are calculated;

103: in a second time period, the spatial morphological feature information and/or the motion feature information of a plurality of first time periods are counted to obtain motion process feature information in the second time period;

104: the motion process feature information within a second time period in which a current moment is present and the spatial morphological feature information and/or the motion feature information in a first time period in which the current moment is present are taken as a feature set, and it is determined whether the feature set satisfies a first condition set;

105: when the feature set satisfies the first condition set, it is determined that a posture of the detected target is lying on the floor, for example, it is denoted by lie (floor);

106: it is determined whether the feature set satisfies a second condition set in a case where the feature set does not satisfy the first condition set, it is determined whether the feature set satisfies a third condition set in a case where the feature set satisfies the second condition set, and it is determined that a posture of the detected target is lying in bed in a case where the feature set satisfies the third condition set, for example, it is denoted by lie (bed);

107: it is determined whether the feature set satisfies a fourth condition set in a case where the feature set does not satisfy the second condition set or the third condition set, it is determined whether the feature set satisfies a fifth condition set in a case where the feature set satisfies the fourth condition set, and it is determined that a posture of the detected target is walking in a case where the feature set satisfies the fifth condition set, for example, it is denoted by walk.

It should be noted that FIG. 1 only schematically illustrates the embodiment of this disclosure; however, this disclosure is not limited thereto. For example, an order of execution of the steps (operations) may be appropriately adjusted, and furthermore, some other steps may be added, or some steps therein may be reduced. And appropriate variants may be made by those skilled in the art according to the above contents, without being limited to what is contained in FIG. 1.

In some embodiments, the first time period is, for example, 0.2 s, and in 102, the spatial morphological feature information and/or motion feature information of the object point set may be calculated every 0.2 s, and these feature information may characterize transient features. And the second time period is, for example, 2 s, and the feature information calculated every 0.2 s in 102 (for example, 10 times in 2 s) may be counted to obtain the motion process feature information in the second time period, and these feature information may characterize the process features.

In the embodiments of this disclosure, the transient feature and the process feature are taken as a feature set by combining them, it is first decided whether the posture of the detected object satisfies the condition of lying on the floor, then it is decided whether the posture of the detected object satisfies the condition of lying in bed, and finally, it is decided whether the posture of the detected object satisfies the condition of walking. Hence, not only the posture of the detected object may be decided based on the radar, but also multiple daily actions and postures, such as lying on the floor, lying in bed, or walking, may be recognized at a relatively low amount of calculation and with high precision.

In some embodiments, (x, y, z) is three-dimensional space coordinates, doppler is a speed of the reflection points; $r=\sqrt{x^2+y^2}$, x, y are plane coordinates, and z is a height from the ground. Reference may be made to relevant techniques for how to obtain the spatial information and speed information of the detected object and how to perform clustering, etc.

In some embodiments, the spatial morphological feature information includes a height average value $z\_mid$ of the target point set, a height maximum value $z\_max$ of the target point set, a length $x\_range$ of the target point set, a width $y\_range$ of the target point set, and a height $z\_range$ of the target point set;

the motion process feature information includes a number $xy\_z$ by which $x\_range$ or $y\_range$ is greater than $z\_range$ in the second time period, a number $xy\_1$ by which $x\_range$ or $y\_range$ is greater than a first feature threshold in the second time period, a ratio $shape\_ratio$ of a maximum value of $x\_range$ and $y\_range$ to $z\_range$ in the first time period, a maximum value $xy\_range\_var$ of a standard variation between $x\_range$ and $y\_range$ in the second time period, a number $z\_1$ by which $z\_range$ is greater than a second feature threshold in the second time period, and a number $Lost\_frame\_num$ that the target point set is continuously empty in the second time period.

Decision can be performed by combining the above feature information.

In some embodiments, the first condition set is that $z\_mid$ is less than a first condition threshold (for example, 0.3 m), $z\_max$ is less than a second condition threshold (for example, 0.8 m), a sum of $xy\_z$ and $xy\_1$ is greater than zero and $shape\_ratio$ is greater than 1; the second condition set is that $xy\_1$ is greater than zero; the third condition set is that $xy\_z$ is greater than zero, $z\_mid$ is less than a third condition threshold (for example, 1 m), $z\_range$ is less than a fourth condition threshold (for example, 1 m) and $xy\_range\_var$ is greater than a fifth condition threshold (for example, 0.2); the fourth condition set is that $z\_1$ is greater than a sixth condition threshold (for example, 6); and the fifth condition set is that $Lost\_frame\_num$ is less than a seventh condition threshold (for example, N is positive integer, for example, 3).

With the above first condition set to fifth condition set, the postures of "lie on the ground", "lie on the bed" or "walking" can be recognized. In the above decision, the detected target's posture is judged in order, and precision of posture recognition can be improved.

In some embodiments, the above method may further include: determining whether the feature set satisfies a sixth condition set in a case where the feature set does not satisfy the fifth condition set, determining that a posture of the detected target is sifting in a case where the feature set satisfies the sixth condition set, such as being denoted by sit, which may be sifting in bed, or sitting in a sofa, and in a case where the feature set does not satisfy the sixth condition set, determining that a posture of the detected target is standing, such as being denoted by stand; and determining whether the feature set satisfies a seventh condition set in a case where the feature set does not satisfy the fourth condition set, and in a case where the feature set satisfies the seventh condition set, determining that a posture of the detected target is sitting on the floor, such as being denoted by sit on floor.

In some embodiments, the motion feature information includes a maximum velocity $target.doppler$ of reflection points in the target point set, and the motion process feature information further includes a number $r\_range\_2s$ by which r is greater than a third feature threshold (for example, 0.5 m) in the second time period, $r=\sqrt{x^2+y^2}$, a number $r\_range\_1s$ by which r is greater than the third feature threshold (for example, 0.5 m) in a third time period (for example, 1 s) at the start of the second time period, a number $doppler\_2s$ by which $target.doppler$ is greater than a fourth feature threshold (for example, 0.2 m/s) in the second time period, a number $doppler\_1s$ by which $target.doppler$ is greater than the fourth feature threshold (for example, 0.2 m/s) in the third time period (for example, 1 s) at the start of the second time period, and a number $x\_y\_05z$ by which $x\_range$ and $y\_range$ are both greater than a half of $z\_range$ in the second time period.

Condition judgement can be performed by combining the above feature information.

In some embodiments, the sixth condition set is that $r\_range\_2s$ is greater than or equal to an eighth condition threshold (for example, 5) and $doppler\_2s$ is greater than or equal to a ninth condition threshold (for example, 4), or, $r\_range\_1s$ is greater than or equal to a tenth condition threshold (for example, 3) and $doppler\_1s$ is greater than or equal to an eleventh condition threshold (for example, 3), and the seventh condition set is that z_mid is less than a fifteenth condition threshold (for example, 0.6 m), z_max is less than a sixteenth condition threshold (for example, 1 m) and x_y_05z is greater than zero.

With the above sixth condition set and seventh condition set, the postures of "sitting", "standing" or "sitting on the floor" can further be recognized. In the above judgement, the detected target's posture is judged in order, and precision of posture recognition can be improved.

Figure 2:
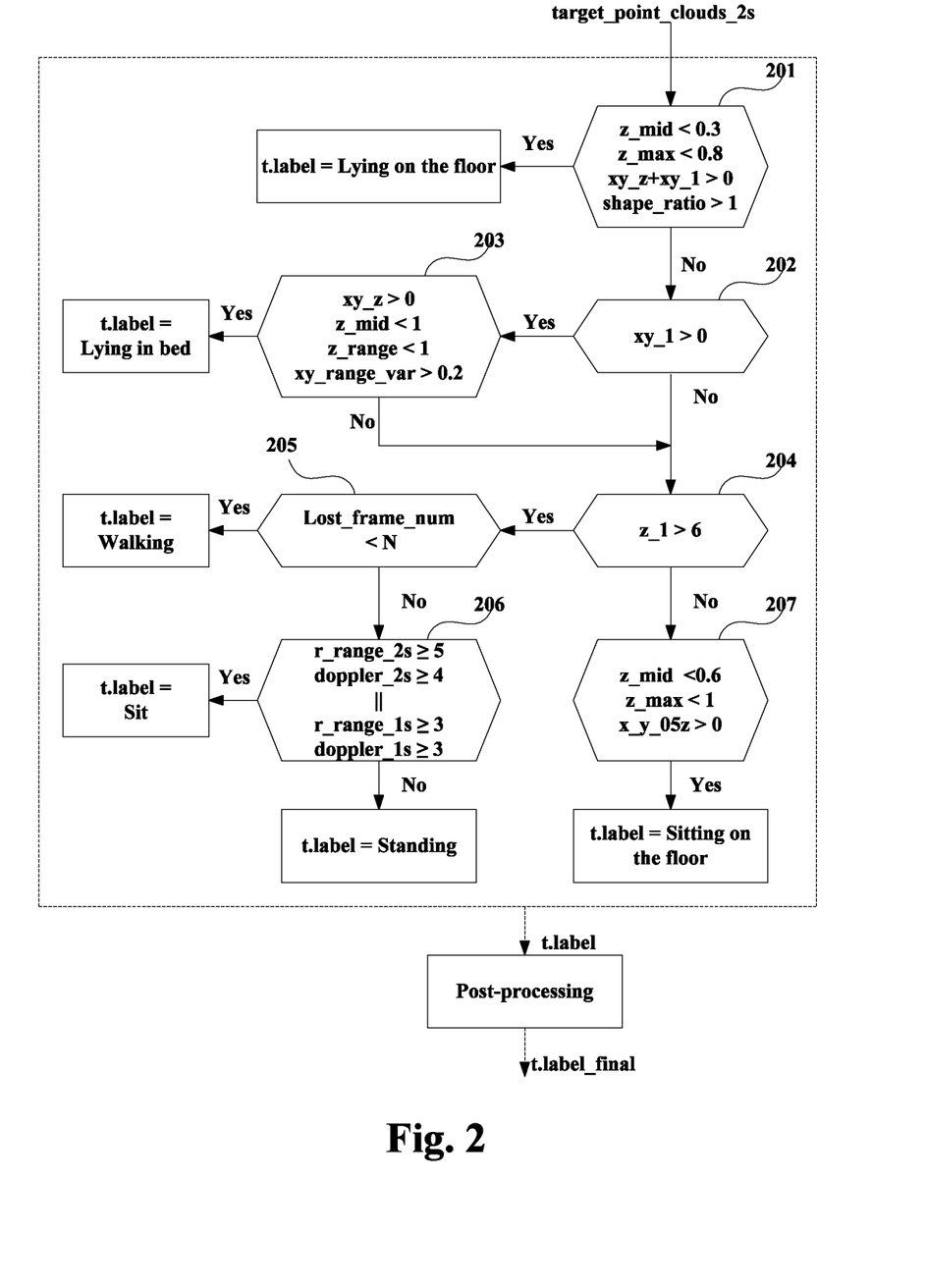
FIG. 2 is an exemplary diagram of the radar-based posture recognition method of an embodiment of this disclosure.

FIG. 2 is an exemplary diagram of the radar-based posture recognition method of an embodiment of this disclosure, in which a case of performing posture recognition according to the first condition set to the seventh condition set is shown. target_point_clouds_2s denotes the feature set calculated in 102 and 103, t.label denotes a tag of a posture, and 201-207 are used in this figure to denote the first condition set to the seventh condition set, respectively. As shown in FIG. 2, post-processing can further be performed after the posture is recognized; for example, t.label_final is obtained after correction described later, so that the recognition accuracy can be further improved.

In some other embodiments, the method further includes: determining whether the feature set satisfies an eighth condition set in a case where the feature set does not satisfy the fifth condition set, and in a case where the feature set satisfies the eighth condition set, determining that a posture of the detected target is standing, for example, it is denoted by stand;

determining whether the feature set satisfies a ninth condition set in a case where the feature set does not satisfy the eighth condition set, and a case where the feature set satisfies the ninth condition set, determining that a posture of the detected target is sitting in, for example, it is denoted by sit;

determining whether the feature set satisfies a tenth condition set in a case where the feature set does not satisfy the ninth condition set, in a case where the feature set satisfies the tenth condition set, determining that a posture of the detected target is sitting, for example, it is denoted by sit, and in a case where the feature set does not satisfy the tenth condition set, determining that a posture of the detected target is standing, for example, it is denoted by stand; and determining whether the feature set satisfies a seventh condition set in a case where the feature set does not satisfy the fourth condition set, and in a case where the feature set satisfies the seventh condition set, determining that a posture of the detected target is sitting on the floor, for example, it is denoted by sit on floor.

In some embodiments, the motion feature information further includes a velocity mean value v_upper_mean of reflection points of heights greater than a fifth feature threshold (for example, z0) in the target point set, a velocity mean value v_lower_mean of reflection points of heights less than or equal to the fifth feature threshold (for example, z0) in the target point set, planar center positions xy_upper of heights greater than a sixth feature threshold (for example, z1) in the target point set, and planar center positions xy_lower of heights less than or equal to the sixth feature threshold (for example, z1) in the target point set;

and the motion process feature information further includes: a mean value d_upper_mean of distances between xy_upper of multiple target point sets in a latter half of the second time period (for example, latter 1 s in 2 s) and xy_upper at a starting time of the second time period, a standard variation d_upper_var of distances between xy_upper of multiple target point sets in the entire second time period (for example, 2 s) and xy_upper at the starting time of the second time period, mean value d_lower_mean of distances between xy_lower of the multiple target point sets in the latter half of the second time period (for example, latter 1 s in 2 s) and xy_lower at the starting time of the second time period, a standard variation d_lower_var of distances between xy_lower of multiple target point sets in the entire second time period (for example, 2 s) and xy_lower at the starting time of the second time period, a number v_mask by which v_upper_mean is greater than v_lower_mean in the second time period, and a number x_y_05z by which x_range and y_range are both greater than a half of z_range in the second time period.

Condition judgement can be performed by combining the above feature information.

In some embodiments, the seventh condition set is that z_mid is less than a fifteenth condition threshold (for example, 0.6 m), z_max is less than a sixteenth condition threshold (for example, 1 m) and x_y_05z is greater than zero, the eighth condition set is that r_range_2s is less than a twelfth condition threshold (for example, 3), the ninth condition set is that d_upper_var is greater than d_lower_var, and a difference between d_upper_mean and d_lower_mean is greater than or equal to a thirteenth condition threshold (for example, 0.15 m), and the tenth condition set is that v_mask is greater than or equal to a fourteenth condition threshold (for example, 5).

With the above seventh condition set to ten condition set, the postures of "sitting", "standing" or "sitting on the floor" can further be recognized. In the above judgement, the detected target' posture is judged in order, and precision of posture recognition can be improved.

Figure 3:
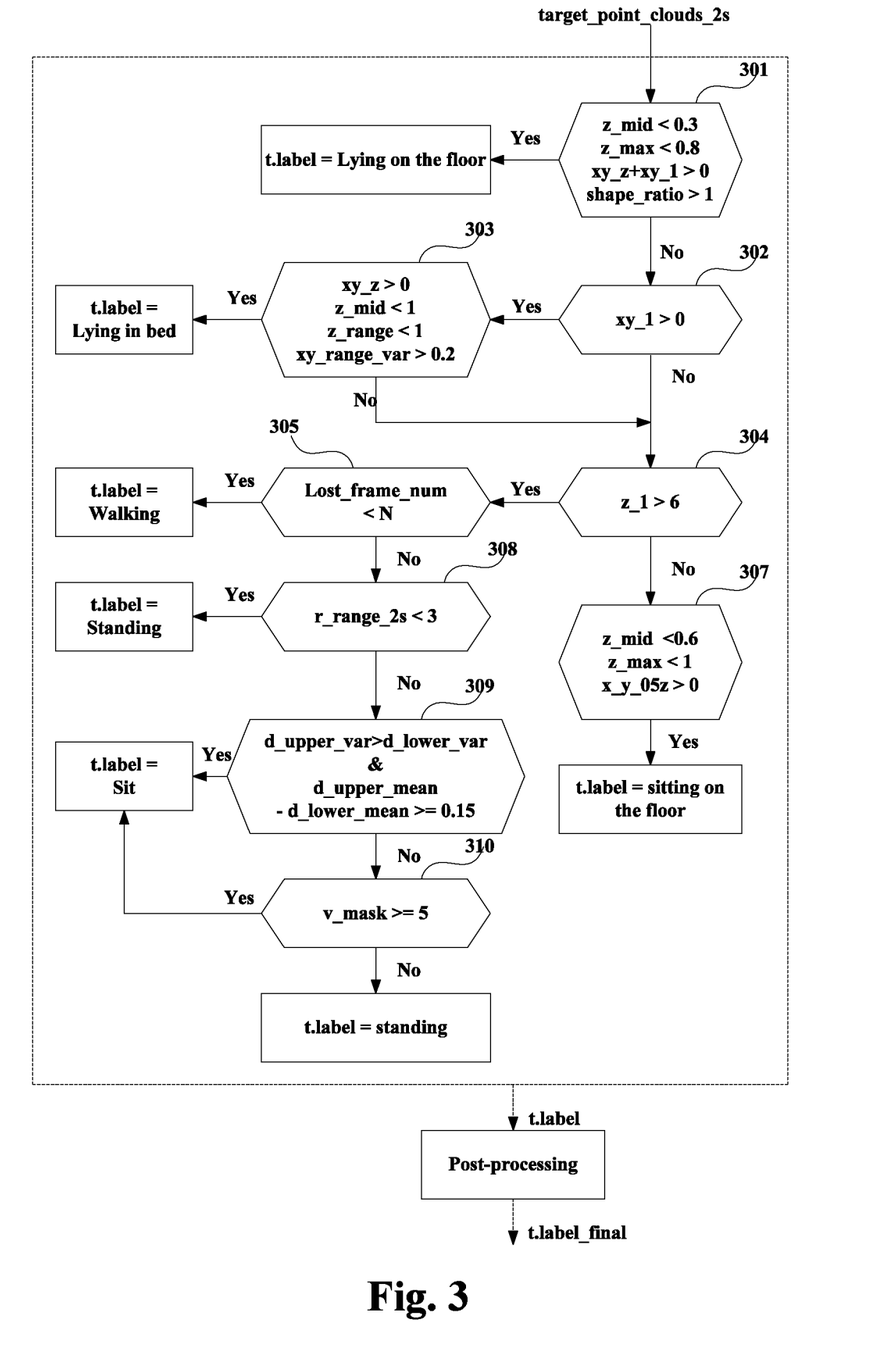
FIG. 3 is another exemplary diagram of the radar-based posture recognition method of the embodiment of this disclosure.

FIG. 3 is another exemplary diagram of the radar-based posture recognition method of the embodiment of this disclosure, in which a case of performing posture recognition according to the first condition set to the fifth condition set and the seventh condition set to the tenth condition set is shown. target_point_clouds_2s denotes the feature set calculated in 102 and 103, t.label denotes a tag of a posture, and 301-305 and 307-310 are used in the figure to represent the first condition set to the fifth condition set, the seventh condition set to the tenth condition set, respectively. As shown in FIG. 3, post-processing may further be performed after the posture is recognized; for example, t.label_final is obtained after correction described later, so that the recognition accuracy can be further improved.

In some embodiments, the posture of the detected target in one of the second time periods can also be corrected according to the posture of the detected target in multiple consecutive second time periods.

For example, a time window is set to be 2 s, that is, each second time period is a time window, and two consecutive time windows are spaced apart by 0.2 s, then two consecutive time windows overlap by 1.8 s. When postures determined in five consecutive time windows are "walking", "walking", "lying on the floor", "walking", and "walking", as the detected target cannot complete actions from walking to lying on the floor and to walking within 0.2 s, the posture of the third time window can be corrected into "walking". The above only illustrates how to make corrections, and the disclosure is not limited thereto.

The above describes only the steps or processes related to this disclosure; however, this disclosure is not limited thereto. The recognition method may further include other steps or processes, and reference may be made to the relevant art for particular contents of these steps or processes. Moreover, the embodiments of this disclosure are described above by taking the above feature information as an example. However, this disclosure is not limited to these information, and appropriate modifications may be made to these information, and implementations of these modifications should be included in the scope of the embodiments of this disclosure.

The embodiments of this disclosure are exemplarily described above; however, this disclosure is not limited thereto, and appropriate modifications may be made on the basis of the above embodiments. For example, the above embodiments may be used separately, or one or more of the above embodiments may be used in a combined manner.

It can be seen from the above embodiments that the process features in the second time period and the transient features in the first time period are taken as a feature set by combining them, it is first decided whether the posture of the detected object satisfies the condition of lying on the floor, then it is decided whether the posture of the detected object satisfies the condition of lying in bed, and then it is decided whether the posture of the detected object satisfies the condition of walking. Hence, not only the posture of the detected object can be decided based on the radar, but also multiple daily actions and postures can be recognized with high precision at a relatively low amount of calculation.

Embodiments of the Second Aspect

The embodiment of this disclosure provides a radar-based posture recognition apparatus, with contents identical to those in the embodiments of the first aspect being not going to be described herein any further.

Figure 4:
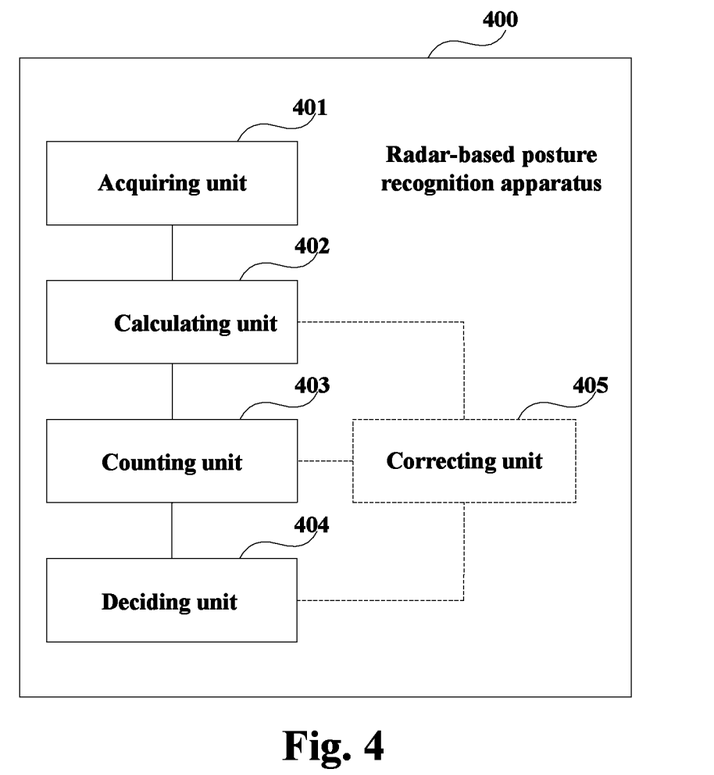
FIG. 4 is a schematic diagram of the radar-based posture recognition apparatus of an embodiment of this disclosure.

FIG. 4 is a schematic diagram of the radar-based posture recognition apparatus of an embodiment of this disclosure. As shown in FIG. 4, a radar-based posture recognition apparatus 400 includes:

an acquiring unit 401 configured to acquire radar reflection point information based on radar echo signals reflected from a detected target, and cluster radar reflection points;

a calculating unit 402 configured to, in a first time period, calculate spatial morphological feature information and/or motion feature information of a target point set obtained by clustering;

a counting unit 403 configured to, in a second time period, count the spatial morphological feature information and/or the motion feature information of a plurality of first time periods to obtain motion process feature information in the second time period, and a deciding unit 404 configured to take the motion process feature information within a second time period in which a current moment is present and the spatial morphological feature information and/or the motion feature information in a first time period in which the current moment is present as a feature set, and determine whether the feature set satisfies a first condition set;

determine that a posture of the detected target is lying on the floor when the feature set satisfies the first condition set;

determine whether the feature set satisfies a second condition set in a case where the feature set does not satisfy the first condition set, determine whether the feature set satisfies a third condition set in a case where the feature set satisfies the second condition set, determine that a posture of the detected target is lying in bed in a case where the feature set satisfies the third condition set;

determine whether the feature set satisfies a fourth condition set in a case where the feature set does not satisfy the second condition set or the third condition set, determine whether the feature set satisfies a fifth condition set in a case where the feature set satisfies the fourth condition set, determine that a posture of the detected target is walking in a case where the feature set satisfies the fifth condition set.

In some embodiments, the deciding unit 404 is further configured to:

determine whether the feature set satisfies a sixth condition set in a case where the feature set does not satisfy the fifth condition set, determine that a posture of the detected target is sitting in a case where the feature set satisfies the sixth condition set, and determine that a posture of the detected target is standing in a case where the feature set does not satisfy the sixth condition set.

In some embodiments, the deciding unit 404 is further configured to:

determine whether the feature set satisfies an eighth condition set in a case where the feature set does not satisfy the fifth condition set, determine that a posture of the detected target is standing in a case where the feature set satisfies the eighth condition set;

determine whether the feature set satisfies a ninth condition set in a case where the feature set does not satisfy the eighth condition set, determine that a posture of the detected target is sitting in a case where the feature set satisfies the ninth condition set;

determine whether the feature set satisfies a tenth condition set in a case where the feature set does not satisfy the ninth condition set, determine that a posture of the detected target is sitting in a case where the feature set satisfies the tenth condition set, and determine that a posture of the detected target is standing in a case where the feature set does not satisfy the tenth condition set.

In some embodiments, the deciding unit 404 is further configured to:

determine whether the feature set satisfies a seventh condition set in a case where the feature set does not satisfy the fourth condition set, and determine that a posture of the detected target is sitting on the floor in a case where the feature set satisfies the seventh condition set.

In some embodiments, the spatial morphological feature information includes a height average value z_mid of the target point set, a height maximum value z_max of the target point set, a length x_range of the target point set, a width y_range of the target point set, and a height z_range of the target point set;

the motion process feature information includes a number xy_z by which x_range or y_range is greater than z_range in the second time period, a number xy_1 by which x_range or y_range is greater than a first feature threshold in the second time period, a ratio shape_ratio of a maximum value of x_range and y_range to z_range in the first time period, a maximum value xy_range_var of a standard variation between x_range and y_range in the second time period, a number z_1 by which z_range is greater than a second feature threshold in the second time period, and a number Lost_frame_num that the target point set is continuously empty in the second time period;

the first condition set is that z_mid is less than a first condition threshold (for example, 0.3 m), z_max is less than a second condition threshold (for example, 0.8 m), a sum of xy_z and xy_1 is greater than zero and shape_ratio is greater than 1;

the second condition set is that xy_1 is greater than zero;

the third condition set is that xy_z is greater than zero, z_mid is less than a third condition threshold (for example, 1 m), z_range is less than a fourth condition threshold (for example, 1 m) and xy_range_var is greater than a fifth condition threshold (for example, 0.2);

the fourth condition set is that z_1 is greater than a sixth condition threshold (for example, 6);

and the fifth condition set is that Lost_frame_num is less than a seventh condition threshold (for example, N).

In some embodiments, the motion feature information includes a maximum velocity target.doppler of reflection points in the target point set, and the motion process feature information further includes a number r_range_2s by which r is greater than a third feature threshold (for example, 0.5 m) in the second time period, $r=\sqrt{x^2+y^2}$, a number r_range_1s by which r is greater than the third feature threshold (for example, 0.5 m) in a-third time period (for example, 1 s) at the start of the second time period, a number doppler_2s by which target-.doppler is greater than a fourth feature threshold (for example, 0.2 m/s) in the second time period, a number doppler_1s by which target.doppler is greater than the fourth feature threshold (for example, 0.2 m/s) in the third time period (for example, 1 s) at the start of second time period;

the sixth condition set is that r_range_2s is greater than or equal to an eighth condition threshold (for example, 5) and doppler_2s is greater than or equal to a ninth condition threshold (for example, 4), or, r_range_1s is greater than or equal to a tenth condition threshold (for example, 3) and doppler_1 s is greater than or equal to an eleventh condition threshold (for example, 3).

In some embodiments, the motion feature information further includes a velocity mean value v_upper_mean of reflection points of heights greater than a fifth feature threshold (for example, z0) in the target point set, a velocity mean value v_lower_mean of reflection points of heights less than or equal to the fifth feature threshold (for example, z0) in the target point set, planar center positions xy_upper of heights greater than a sixth feature threshold (for example, z1) in the target point set, and planar center positions xy_lower of heights less than or equal to the sixth feature threshold (for example, z1) in the target point set;

the motion process feature information further includes: a mean value d_upper_mean of distances between xy_upper of multiple target point sets in a latter half of the second time period (for example, latter 1 s in 2 s) and xy_upper at a starting time of the second time period, a standard variation d_upper_var of distances between xy_upper of multiple target point sets in the entire second time period (for example, 2 s) and xy_upper at the starting time of the second time period, mean value d_lower_mean of distances between xy_lower of the multiple target point sets in the latter half of the second time period (for example, latter 1 s in 2 s) and xy_lower at the starting time of the second time period, a standard variation d_lower_var of distances between xy_lower of multiple target point sets in the entire second time period (for example, 2 s) and xy_lower at the starting time of the second time period, a number v_mask by which v_upper_mean is greater than v_lower_mean in the second time period;

the eighth condition set is that r_range_2s is less than a twelfth condition threshold (for example, 3);

the ninth condition set is that d_upper_var is greater than d_lower_var, and a difference between d_upper_mean and d_lower_mean is greater than or equal to a thirteenth condition threshold (for example, 0.15 m);

and the tenth condition set is that v_mask is greater than or equal to a fourteenth condition threshold (for example, 5).

In some embodiments, the motion feature information further includes: a number x_y_05z by which x_range and y_range are both greater than a half of z_range in the second time period;

and the seventh condition set is that z_mid is less than a fifteenth condition threshold (for example, 0.6 m), z_max is less than a sixteenth condition threshold (for example, 1 m) and x_y_05z is greater than zero.

In some embodiments, as shown in FIG. 4, the radar-based posture recognition apparatus 400 further includes:

a correcting unit 405 configured to correct a posture of the detected target in one of multiple continuous second time periods according to postures of the detected target in the second time periods.

It should be noted that the components or modules related to this disclosure are only described above. However, this disclosure is not limited thereto, and the radar-based posture recognition apparatus 400 may further include other components or modules, and reference may be made to related techniques for particulars of these components or modules.

For the sake of simplicity, connection relationships between the components or modules or signal profiles thereof are only illustrated in FIG. 4. However, it should be understood by those skilled in the art that such related techniques as bus connection, may be adopted. And the above components or modules may be implemented by hardware, such as a processor, and a memory, which are not limited in the embodiment of this disclosure.

The embodiments of this disclosure are exemplarily described above; however, this disclosure is not limited thereto, and appropriate modifications may be made on the basis of the above embodiments. For example, the above embodiments may be used separately, or one or more of the above embodiments may be used in a combined manner.

It can be seen from the above embodiments that the process feature in the second time period and the transient feature in the first time period are taken as a feature set by combining them, it is first decided whether the posture of the detected object satisfies the condition of lying on the floor, then it is decided whether the posture of the detected object satisfies the condition of lying in bed, and finally, it is decided whether the posture of the detected object satisfies the condition of walking. Hence, not only the posture of the detected object may be decided based on the radar, but also multiple daily actions and postures may be recognized at a relatively low amount of calculation and with high precision.

Embodiments of the Third Aspect

The embodiment of this disclosure provides an electronic device, including the radar-based posture recognition apparatus as described in the embodiment of the second aspect, the contents of which being incorporated herein. The electronic device may be, for example, a computer, a server, a work station, a lap-top computer, and a smart mobile phone; however, the embodiment of this disclosure is not limited thereto.

Figure 5:
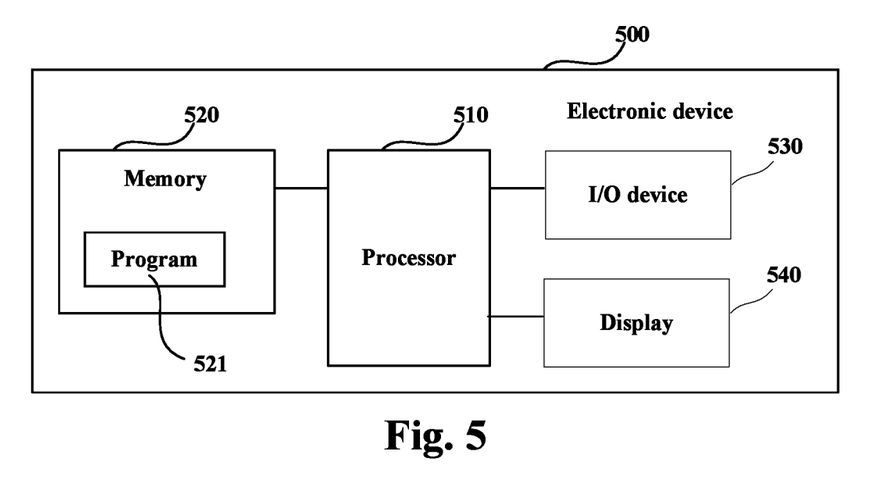
FIG. 5 is a schematic diagram of the electronic device of an embodiment of this disclosure.

FIG. 5 is a schematic diagram of the electronic device of the embodiment of this disclosure. As shown in FIG. 5, an electronic device 500 may include a processor 510 (such as a central processing unit (CPU)) and a memory 520, the memory 520 being coupled to the processor 510. The memory 520 may store various data, and furthermore, it may store a program 521 for information processing, and execute the program 521 under control of the processor 510.

In some embodiments, functions of the radar-based posture recognition apparatus 400 may be integrated into the processor 510. The processor 510 may be configured to carry out the radar-based posture recognition method as described in the embodiment of the first aspect.

In some embodiments, the radar-based posture recognition apparatus 400 and the processor 510 are configured separately. For example, the radar-based posture recognition apparatus 400 may be configured as a chip connected to the processor 510, and the functions of the radar-based posture recognition apparatus 400 are executed under control of the processor 510.

Furthermore, as shown in FIG. 5, the electronic device 500 may include an input/output (I/O) device 530, and a display 540, etc. Functions of the above components are similar to those in the relevant art, and shall not be described herein any further. It should be noted that the electronic device 500 does not necessarily include all the parts shown in FIG. 5, and furthermore, the electronic device 500 may include parts not shown in FIG. 5, and the relevant art may be referred to.

An embodiment of the present disclosure provides a computer readable program, which, when executed in an electric device, will cause a computer to carry out the radar-based posture recognition method described in the embodiment of the first aspect in the electronic device.

An embodiment of the present disclosure provides a storage medium including a computer readable program, which will cause a computer to carry out the radar-based posture recognition method described in the embodiment of the first aspect in an electronic device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A radar-based posture recognition method, including:

acquiring radar reflection point information based on radar echo signals reflected from a detected target, and clustering radar reflection points;

in a first time period (for example, 0.2 s), calculating spatial morphological feature information and/or motion feature information of a target point set obtained by clustering;

in a second time period (for example, 2 s), counting the spatial morphological feature information and/or the motion feature information of a plurality of first time periods (for example, 10) to obtain motion process feature information in the second time period, and taking the motion process feature information within a second time period in which a current moment is present and the spatial morphological feature information and/or the motion feature information in a first time period in which the current moment is present as a feature set, and determining whether the feature set satisfies a first condition set;

the method further includes:

determining that a posture of the detected target is lying on the floor when the feature set satisfies the first condition set;

determining whether the feature set satisfies a second condition set in a case where the feature set does not satisfy the first condition set, determining whether the feature set satisfies a third condition set in a case where the feature set satisfies the second condition set, determining that a posture of the detected target is lying in bed in a case where the feature set satisfies the third condition set;

determining whether the feature set satisfies a fourth condition set in a case where the feature set does not satisfy the second condition set or the third condition set, determining whether the feature set satisfies a fifth condition set in a case where the feature set satisfies the fourth condition set, and determining that a posture of the detected target is walking in a case where the feature set satisfies the fifth condition set.

Supplement 2. The method according to supplement 1, wherein the method further includes:

determining whether the feature set satisfies a sixth condition set in a case where the feature set does not satisfy the fifth condition set, determining that a posture of the detected target is sitting in a case where the feature set satisfies the sixth condition set, and determining that a posture of the detected target is standing in a case where the feature set does not satisfy the sixth condition set.

Supplement 3. The method according to supplement 1, wherein the method further includes:

determining whether the feature set satisfies an eighth condition set in a case where the feature set does not satisfy the fifth condition set, determining that a posture of the detected target is standing in a case where the feature set satisfies the eighth condition set;

determining whether the feature set satisfies a ninth condition set in a case where the feature set does not satisfy the eighth condition set, determining that a posture of the detected target is sitting in a case where the feature set satisfies the ninth condition set;

determining whether the feature set satisfies a tenth condition set in a case where the feature set does not satisfy the ninth condition set, determining that a posture of the detected target is sitting in a case where the feature set satisfies the tenth condition set, and determining that a posture of the detected target is standing in a case where the feature set does not satisfy the tenth condition set.

Supplement 4. The method according to any one of supplement 1-3, wherein the method further includes:

determining whether the feature set satisfies a seventh condition set in a case where the feature set does not satisfy the fourth condition set, and determining that a posture of the detected target is sitting on the floor in a case where the feature set satisfies the seventh condition set.

Supplement 5. The method according to any one of supplement 1-4, wherein, the spatial morphological feature information includes a height average value z_mid of the target point set, a height maximum value z_max of the target point set, a length x_range of the target point set, a width y_range of the target point set, and a height z_range of the target point set;

the motion process feature information includes a number xy_z by which x_range or y_range is greater than z_range in the second time period, a number xy_1 by which x_range or y_range is greater than a first feature threshold (for example, 1 m) in the second time period, a ratio shape_ratio of a maximum value of x_range and y_range to z_range in the first time period, a maximum value xy_range_var of a standard variation between x_range and y_range in the second time period, a number z_1 by which z_range is greater than a second feature threshold (for example, 1 m) in the second time period, and a number Lost_frame_num that the target point set is continuously empty in the second time period;

the first condition set is that z_mid is less than a first condition threshold (for example, 0.3 m), z_max is less than a second condition threshold (for example, 0.8 m), a sum of xy_z and xy_1 is greater than zero and shape_ratio is greater than 1;

the second condition set is that xy_1 is greater than zero;

the third condition set is that xy_z is greater than zero, z_mid is less than a third condition threshold (for example, 1 m), z_range is less than a fourth condition threshold (for example, 1 m) and xy_range_var is greater than a fifth condition threshold (for example, 0.2);

the fourth condition set is that z_1 is greater than a sixth condition threshold (for example, 6);

and the fifth condition set is that Lost_frame_num is less than a seventh condition threshold (for example, N).

Supplement 6. The method according to supplement 5, wherein, the motion feature information includes a maximum velocity target.doppler of reflection points in the target point set, and the motion process feature information further includes a number r_range_2s by which r is greater than a third feature threshold (for example, 0.5 m) in the second time period, $r=\sqrt{x^2+y^2}$, a number r_range_1s by which r is greater than the third feature threshold (for example, 0.5 m) in a starting third time period (for example, 1 s) in the second time period, a number doppler_2s by which target.doppler is greater than a fourth feature threshold (for example, 0.2 m/s) in the second time period, a number doppler_1s by which target.doppler is greater than the fourth feature threshold (for example, 0.2 m/s) in the starting third time period (for example, 1 s) in the second time period;

the sixth condition set is that r_range_2s is greater than or equal to an eighth condition threshold (for example, 5) and doppler_2s is greater than or equal to a ninth condition threshold (for example, 4), or, r_range_1s is greater than or equal to a tenth condition threshold (for example, 3) and doppler_1 s is greater than or equal to an eleventh condition threshold (for example, 3).

Supplement 7. The method according to supplement 5, wherein, the motion feature information further includes a velocity mean value v_upper_mean of reflection points of heights greater than a fifth feature threshold (for example, z0) in the target point set, a velocity mean value v_lower_mean of reflection points of heights less than or equal to the fifth feature threshold (for example, z0) in the target point set, planar center positions xy_upper of heights greater than a sixth feature threshold (for example, z1) in the target point set, and planar center positions xy_lower of heights less than or equal to the sixth feature threshold (for example, z1) in the target point set;

the motion process feature information further includes: a mean value d_upper_mean of distances between xy_upper of multiple target point sets in a latter half of the second time period (for example, latter 1 s in 2 s) and xy_upper at a starting time of the second time period, a standard variation d_upper_var of distances between xy_upper of multiple target point sets in the entire second time period (for example, 2 s) and xy_upper at the starting time of the second time period, mean value d_lower_mean of distances between xy_lower of the multiple target point sets in the latter half of the second time period (for example, latter 1 s in 2 s) and xy_lower at the starting time of the second time period, a standard variation d_lower_var of distances between xy_lower of multiple target point sets in the entire second time period (for example, 2 s) and xy_lower at the starting time of the second time period, and a number v_mask by which v_upper_mean is greater than v_lower_mean in the second time period;

the eighth condition set is that r_range_2s is less than a twelfth condition threshold (for example, 3);

the ninth condition set is that d_upper_var is greater than d_lower_var, and a difference between d_upper_mean and d_lower_mean is greater than or equal to a thirteenth condition threshold (for example, 0.15);

and the tenth condition set is that v_mask is greater than or equal to a fourteenth condition threshold (for example, 5).

Supplement 8. The method according to supplement 6 or 7, wherein, the motion process feature information further includes: a number x_y_05z by which x_range and y_range are both greater than a half of z_range in the second time period;

and the seventh condition set is that $z\_mid$ is less than a fifteenth condition threshold (for example, 0.6 m), $z\_max$ is less than a sixteenth condition threshold (for example, 1 m) and $x\_y\_05z$ is greater than zero.

What is claimed is:

1. An apparatus for radar-based posture recognition, comprising:
a memory that stores a plurality of instructions; and
a processor coupled to the memory and configured to execute the plurality of instructions to:
acquire radar reflection point information based on radar echo signals reflected from a detected target, and cluster radar reflection points;
calculate, in a first time period, spatial morphological feature information and/or motion feature information of a target point set obtained by clustering;
count, in a second time period, the spatial morphological feature information and/or the motion feature information of a plurality of first time periods including the first time period to obtain motion process feature information in the second time period, and
take the motion process feature information within a time period in which a current moment is present and take the spatial morphological feature information and/or the motion feature information in another time period in which the current moment is present as a feature set, and determine whether the feature set satisfies a first condition set;
the processor is further configured to:
determine that a posture of the detected target is that of lying on a floor when the feature set is determined to satisfy the first condition set;
determine whether the feature set satisfies a second condition set in a case where the feature set is determined not to satisfy the first condition set; determine whether the feature set satisfies a third condition set in a case where the feature set satisfies the second condition set; determine that a posture of the detected target is that of lying in a bed in a case where the feature set is determined to satisfy the third condition set, and
determine whether the feature set satisfies a fourth condition set in a case where the feature set is determined not to satisfy the second condition set or the third condition set; determine whether the feature set satisfies a fifth condition set in a case where the feature set is determined to satisfy the fourth condition set, and determine that a posture of the detected target is that of walking in a case where the feature set is determined to satisfy the fifth condition set,
wherein,
the spatial morphological feature information comprises a length $x\_range$ of the target point set, and a width $y\_range$ of the target point set;
the motion process feature information comprises a number $xy\_1$ by which $x\_range$ or $y\_range$ is greater than a first feature threshold in the second time period.

2. The apparatus according to claim 1, wherein the processor is further configured to:
determine whether the feature set satisfies a sixth condition set in a case where the feature set is determined to not satisfy the fifth condition set; determine that a posture of the detected target is that of sitting in a case where the feature set is determined to satisfy the sixth condition set, and determine that a posture of the detected target is that of standing in a case where the feature set is determined not to satisfy the sixth condition set.

3. The apparatus according to claim 1, wherein the processor is further configured to:
determine whether the feature set satisfies an eighth condition set in a case where the feature set is determined to not satisfy the fifth condition set; determine that a posture of the detected target is that of standing in a case where the feature set is determined to satisfy the eighth condition set;
determine whether the feature set satisfies a ninth condition set in a case where the feature set is determined to not satisfy the eighth condition set; determine that a posture of the detected target is that of sitting in a case where the feature set satisfies the ninth condition set;
determine whether the feature set satisfies a tenth condition set in a case where the feature set is determined to not satisfy the ninth condition set; determine that a posture of the detected target is that of sitting in a case where the feature set satisfies the tenth condition set, and determine that a posture of the detected target is that of standing in a case where the feature set is determined to not satisfy the tenth condition set.

4. The apparatus according to claim 1, wherein the processor is further configured to:
determine whether the feature set satisfies a seventh condition set in a case where the feature set is determined to not satisfy the fourth condition set, and determine that a posture of the detected target is that of sitting on the floor in a case where the feature set is determined to satisfy the seventh condition set.

5. The apparatus according to claim 1, wherein,
the spatial morphological feature information further comprises a height average value $z\_mid$ of the target point set, a height maximum value $z\_max$ of the target point set, and a height $z\_range$ of the target point set;
the motion process feature information further comprises a number $xy\_z$ by which $x\_range$ or $y\_range$ is greater than $z\_range$ in the second time period, a ratio $shape\_ratio$ of a maximum value of $x\_range$ and $y\_range$ to $z\_range$ in the first time period, a maximum value $xy\_range\_var$ of a standard variation between $x\_range$ and $y\_range$ in the second time period, a number $z\_1$ by which $z\_range$ is greater than a second feature threshold in the second time period, and a number $Lost\_frame\_num$ that the target point set is continuously empty in the second time period;
the first condition set is that $z\_mid$ is less than a first condition threshold, $z\_max$ is less than a second condition threshold, a sum of $xy\_z$ and $xy\_1$ is greater than zero and $shape\_ratio$ is greater than 1; the second condition set is that $xy\_1$ is greater than zero; the third condition set is that $xy\_z$ is greater than zero, $z\_mid$ is less than a third condition threshold, $z\_range$ is less than a fourth condition threshold and $xy\_range\_var$ is greater than a fifth condition threshold; the fourth condition set is that $z\_1$ is greater than a sixth condition threshold; and the fifth condition set is that $Lost\_frame\_num$ is less than a seventh condition threshold.

6. The apparatus according to claim 5, wherein,
the motion feature information comprises a maximum velocity $target.doppler$ of reflection points in the target point set, and
the motion process feature information further comprises a number $r\_range\_2s$ by which $r$ is greater than a third feature threshold in the second time period, $r=\sqrt{x^2+y^2}$, a number r_range_1s by which r is greater than the third feature threshold in a third time period at the start of the second time period, a number doppler_2s by which target.doppler is greater than a fourth feature threshold in the second time period, a number doppler_1s by which target.doppler is greater than the fourth feature threshold in the third time period at a start of the second time period, and a number x_y_05z by which x_range and y_range are both greater than a half of z_range in the second time period;

the sixth condition set is that r_range_2s is greater than or equal to an eighth condition threshold and doppler_2s is greater than or equal to a ninth condition threshold, or, r_range_1s is greater than or equal to a tenth condition threshold and doppler_1s is greater than or equal to an eleventh condition threshold, and the seventh condition set is that z_mid is less than a fifteenth condition threshold, z_max is less than a sixteenth condition threshold and x_y_05z is greater than zero.

7. The apparatus according to claim 5, wherein, the motion feature information further comprises a velocity mean value v_upper_mean of reflection points of heights greater than a fifth feature threshold in the target point set, a velocity mean value v_lower_mean of reflection points of heights less than or equal to the fifth feature threshold in the target point set, planar center positions xy_upper of heights greater than a sixth feature threshold in the target point set, and planar center positions xy_lower of heights less than or equal to the sixth feature threshold in the target point set;

the motion process feature information further comprises: a mean value d_upper_mean of distances between xy_upper of multiple target point sets in a latter half of the second time period and xy_upper at a starting time of the second time period, a standard variation d_upper_var of distances between xy_upper of multiple target point sets in entirety of the second time period and xy_upper at the starting time of the second time period, mean value d_lower_mean of distances between xy_lower of the multiple target point sets in the latter half of the second time period and xy_lower at the starting time of the second time period, a standard variation d_lower_var of distances between xy_lower of multiple target point sets in the entire second time period and xy_lower at the starting time of the second time period, a number v_mask by which v_upper_mean is greater than v_lower_mean in the second time period, and a number x_y_05z by which x_range and y_range are both greater than a half of z_range in the second time period;

the seventh condition set is that z_mid is less than a fifteenth condition threshold, z_max is less than a sixteenth condition threshold and x_y_05z is greater than zero, an eighth condition set is that r_range_2s is less than a twelfth condition threshold, a ninth condition set is that d_upper_var is greater than d_lower_var, and a difference between d_upper_mean and d_lower_mean is greater than or equal to a thirteenth condition threshold, and a tenth condition set is that v_mask is greater than or equal to a fourteenth condition threshold.

8. The apparatus according to claim 1, wherein the processor is further configured to:
correct a posture of the detected target in one of multiple continuous second time periods according to postures of the detected target in the second time periods including the second time period.

9. A method for radar-based posture recognition, comprising:
acquiring radar reflection point information based on radar echo signals reflected from a detected target, and clustering radar reflection points;
calculating, in a first time period, spatial morphological feature information and/or motion feature information of a target point set obtained by clustering;
counting, in a second time period, the spatial morphological feature information and/or the motion feature information of a plurality of first time periods including the first time period to obtain motion process feature information in the second time period, and taking the motion process feature information within a time period in which a current moment is present and the spatial morphological feature information and/or taking the motion feature information in another time period in which the current moment is present as a feature set, and determining whether the feature set satisfies a first condition set;

the method further comprises:
determining that a posture of the detected target is lying on a floor when the feature set is determined to satisfy the first condition set,
determining whether the feature set satisfies a second condition set in a case where the feature set is determined not to satisfy the first condition set, determining whether the feature set satisfies a third condition set in a case where the feature set satisfies the second condition set, determining that a posture of the detected target is that of lying in a bed in a case where the feature set is determined to satisfy the third condition set,
determining whether the feature set satisfies a fourth condition set in a case where the feature set is determined not to satisfy the second condition set or the third condition set, determining whether the feature set satisfies a fifth condition set in a case where the feature set is determined to satisfy the fourth condition set, determining that a posture of the detected target is that of walking in a case where the feature set is determined to satisfy the fifth condition set,
wherein,
the spatial morphological feature information comprises a length x_range of the target point set, and a width y_range of the target point set;
the motion process feature information comprises a number xy_1 by which x_range or y_range is greater than a first feature threshold in the second time period.

10. An electronic device, comprising a memory and a processor, the memory storing a computer program, and the processor being configured to carry out the radar-based posture recognition method as claimed in claim 9.

* * * * *